(12) United States Patent
Hanking

(10) Patent No.: US 9,104,198 B2
(45) Date of Patent: Aug. 11, 2015

(54) OPTIMIZED STORAGE AND ACCESS METHOD FOR A HISTORIAN SERVER OF AN AUTOMATED SYSTEM

(75) Inventor: Heino Hanking, Minden (DE)

(73) Assignee: ABB TECHNOLOGY AG, Zurich (CH)

(*) Notice: Subject to any disclaimer, the term of this patent is extended or adjusted under 35 U.S.C. 154(b) by 1468 days.

(21) Appl. No.: 12/464,520

(22) Filed: May 12, 2009

(65) Prior Publication Data

US 2009/0271364 A1   Oct. 29, 2009

Related U.S. Application Data

(63) Continuation of application No. PCT/EP2007/009554, filed on Nov. 5, 2007.

(30) Foreign Application Priority Data

Nov. 13, 2006  (DE) .......................... 10 2006 053 699
Nov. 13, 2006  (DE) .......................... 10 2006 053 700
Aug. 29, 2007  (DE) .......................... 10 2007 040 676

(51) Int. Cl.
*G06F 17/30* (2006.01)
*G05B 21/02* (2006.01)
*G05B 19/418* (2006.01)

(52) U.S. Cl.
CPC ............ *G05B 21/02* (2013.01); *G05B 19/4183* (2013.01); *G05B 2219/31288* (2013.01)

(58) Field of Classification Search
CPC ............... G05B 21/02; G05B 19/4183; G05B 2219/31288
USPC .......... 702/180, 187, 188, 189; 707/705, 725, 707/821, 822, 823, 824, 825, 642, 648, 650, 707/653, 654, 668, 669, 670, 999, 204; 711/161
See application file for complete search history.

(56) References Cited

U.S. PATENT DOCUMENTS 5,339,257 A   8/1994  Layden et al.
5,560,006 A   9/1996  Layden et al.
(Continued)

FOREIGN PATENT DOCUMENTS

DE   102 43 065 A1   4/2004
EP   0 514 104 A2   11/1992
JP   2004-54750 A   2/2004

OTHER PUBLICATIONS

International Search Report (PCT/ISA/210) dated Mar. 19, 2008.
(Continued)

*Primary Examiner* — Jean B Fleurantin
*Assistant Examiner* — Evan Aspinwall
(74) *Attorney, Agent, or Firm* — Buchanan Ingersoll & Rooney PC

(57) ABSTRACT

Exemplary embodiments of the disclosure relate to a method and a system for the storage and processing of process values of a technical process or a technical installation in a historian server which can be integrated into a process control system of a technical installation or of a technical process. In such a method and system a dedicated signal cache can be associated with every process value for its raw values provided by the process. The raw values provided by the process are stored in the respective signal caches and additional internal signal-individual aggregate accumulators for the desired aggregates are associated with every raw value. The aggregate accumulators are incrementally modified for the defined interval when a new raw value is received.

9 Claims, 1 Drawing Sheet

(56) References Cited

U.S. PATENT DOCUMENTS

| | | | |
|---|---|---|---|
| 6,804,627 B1* | 10/2004 | Marokhovsky et al. | 702/182 |
| 6,847,850 B2* | 1/2005 | Grumelart | 700/37 |
| 7,275,062 B2* | 9/2007 | Deitz et al. | 1/1 |
| 7,299,158 B2* | 11/2007 | Behkami et al. | 702/188 |
| 7,461,383 B2* | 12/2008 | Gara et al. | 719/318 |
| 7,590,726 B2* | 9/2009 | Raden et al. | 709/224 |
| 7,620,660 B2* | 11/2009 | Kodavalla et al. | 1/1 |
| 7,627,385 B2* | 12/2009 | McGreevy et al. | 700/20 |
| 7,711,440 B1* | 5/2010 | Campbell et al. | 700/19 |
| 7,712,096 B2* | 5/2010 | Kaczynski et al. | 718/101 |
| 7,720,818 B1* | 5/2010 | Laura | 707/661 |
| 7,738,973 B2* | 6/2010 | McGreevy et al. | 700/17 |
| 7,809,679 B2* | 10/2010 | Nixon et al. | 707/609 |
| 7,840,285 B2* | 11/2010 | Wilson et al. | 700/11 |
| 7,873,660 B1* | 1/2011 | Wong et al. | 707/781 |
| 7,882,089 B1* | 2/2011 | Levy | 707/705 |
| 7,882,262 B2* | 2/2011 | Bhattacharya et al. | 709/238 |
| 7,890,546 B2* | 2/2011 | Shah et al. | 707/803 |
| 7,933,666 B2* | 4/2011 | Campbell et al. | 700/74 |
| 2003/0158795 A1* | 8/2003 | Markham et al. | 705/28 |
| 2004/0181294 A1 | 9/2004 | Deitz et al. | |
| 2005/0022228 A1* | 1/2005 | Davis | 725/28 |
| 2005/0246044 A1 | 11/2005 | Conrad et al. | |
| 2006/0161268 A1 | 7/2006 | Frensch et al. | |
| 2007/0027913 A1* | 2/2007 | Jensen et al. | 707/104.1 |
| 2007/0038889 A1* | 2/2007 | Wiggins et al. | 714/20 |
| 2007/0244571 A1* | 10/2007 | Wilson et al. | 700/11 |
| 2008/0065705 A1* | 3/2008 | Miller | 707/204 |
| 2008/0065706 A1* | 3/2008 | Miller et al. | 707/205 |
| 2008/0125877 A1* | 5/2008 | Miller et al. | 700/29 |
| 2008/0126352 A1* | 5/2008 | Case | 707/10 |
| 2008/0126408 A1* | 5/2008 | Middleton | 707/104.1 |

OTHER PUBLICATIONS

German Search Report dated Nov. 13, 2008.

* cited by examiner

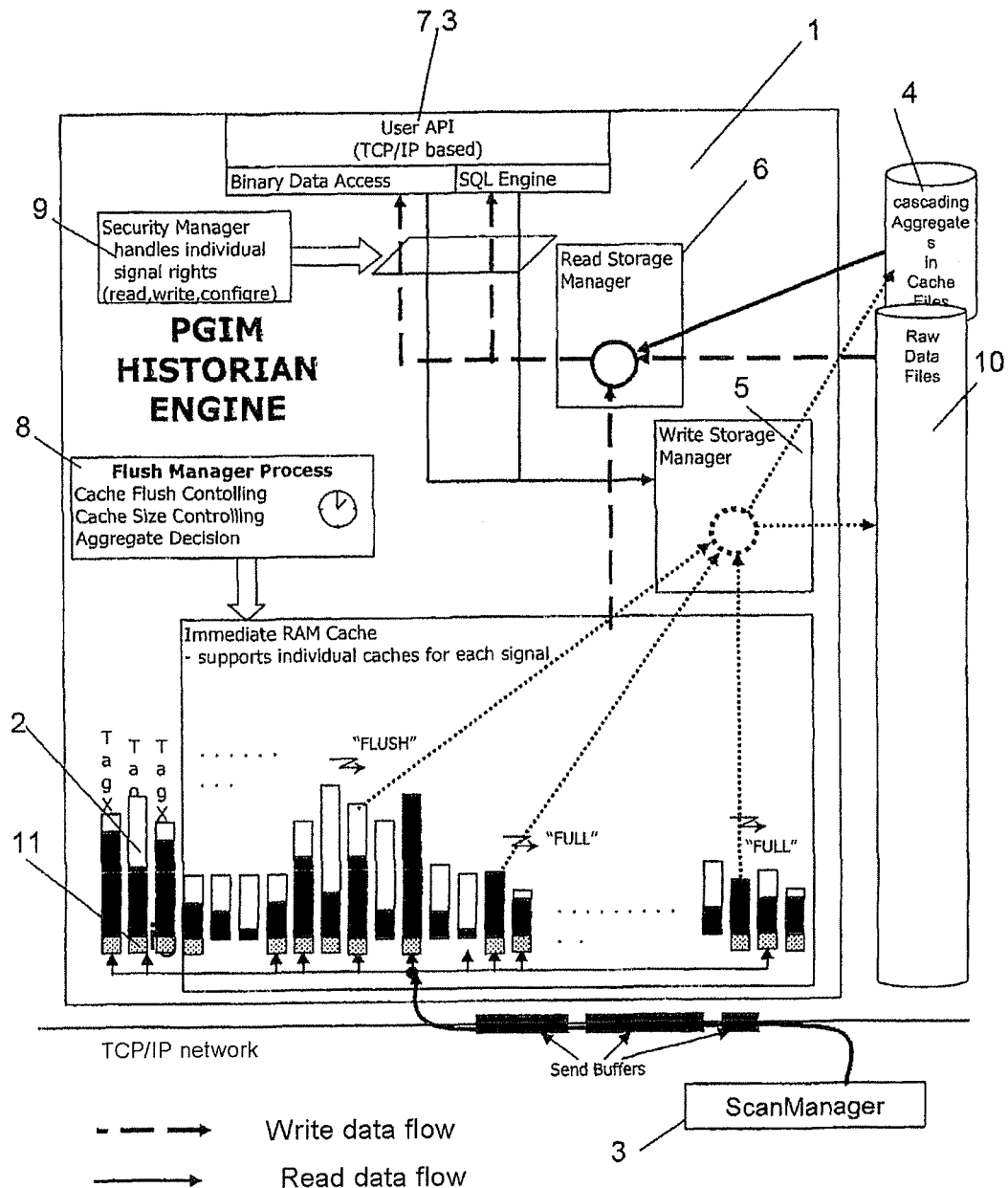

OPTIMIZED STORAGE AND ACCESS METHOD FOR A HISTORIAN SERVER OF AN AUTOMATED SYSTEM

RELATED APPLICATIONS

This application claims priority as a continuation application under 35 U.S.C. §120 to PCT/EP2007/009554, which was filed as an International Application on Nov. 5, 2007 designating the U.S.; and which claims priority to German Application 10 2006 053 699.1 filed in Germany on Nov. 13, 2006, German Application 10 2006 053 700.9 filed in Germany on Nov. 13, 2006, and German Application 10 2007 040 676.4 filed in Germany on Aug. 29, 2007. The entire contents of these applications are hereby incorporated by reference in their entireties.

TECHNICAL FIELD

The disclosure relates to an optimized storage and access method and system for a historian server which can be integrated in a process control system of a technical installation or a technical process. The method according to the disclosure can be specially tailored to the requirements in the automation environment and can result in considerably better properties than were previously possible.

BACKGROUND INFORMATION

For the long-term archiving of process values (also referred to as process measured values or process data), the data are stored in the form of series of measurements (also referred to as measured value histories or process value histories) in a so-called historian server.

The historian server is a special database with real-time functions for collecting process or measurement data, messages and reports (files) for the long-term storage and archiving of the collected data, the collected data and completed reports being stored on the hard disk of a protocol server at defined intervals of time.

In this case, the operation of archiving the data in the historian server is very memory-intensive since the automated system of a technical installation or a technical process provides a large volume of data, that is to say a very large amount of data has to be moved when reading the data even if only a single mean value, for example an annual mean value of a process variable, is required over a long period of time.

The historian servers can continuously query so-called aggregate values (also referred to as threshold or limit values of a process value) over very long periods of time. For this purpose, the entire raw data stock of the required signals must be read and the corresponding aggregates must be determined. Another disadvantage of the currently used methods is based on the overwriting of historical data. In this case, the previously created aggregate values would suddenly become unusable and would only be available again in a new aggregate calculation run to be initiated manually.

The methods cited below are used with the methods which are currently used in automation technology and are intended to store process values (also referred to as signals below) for archiving.

The method which uses a relational approach by means of a relational database operates according to the two variants cited below.

In variant 1, all signals are stored in an "event-driven" manner in a table with their signal index, time stamp, value and status, either the signal index and/or the time stamp being used as the primary index. In this case, the events which trigger storage are the respective changes in measured values around a certain signal-specific tolerance band. All signals are archived in a table in a manner which is not equidistant in terms of time.

In variant 2, all signals are stored in a table in a fixed time pattern, for example every 5 seconds. In this case, the columns form the signal values and the status information.

An exemplary disadvantage is found in both variants in practice: if a very large number of signals, for example more than 1000 signals, are stored in such a table, the operation of reading individual signal time series takes place very slowly since, on account of the SQL access of relational databases, all data or all index tables of all signals are first read in order to then look for the desired signal index and extract the latter. In addition, in variant 2, to a diminishing extent, all signals are recorded at the same speed, for example 5 seconds. Values which change slowly are consequently recorded several times and values which change within 5 seconds can be lost.

When using the relational approach, it is possible to already cyclically determine the required values in advance and to likewise store them on account of the technology of relational databases. For example, so-called OLAP (Online Analytical Processing) solutions usually run once per night and determine and store the desired aggregates. This operation can be very time-consuming and involve a high data throughput since all uncompressed data (also referred to as raw data) have to be read from the hard disk again. In addition, the OLAP run has to be planned and set up, which is associated with a considerable amount of configuration. Furthermore, compression scripts in the database ensure that aggregates, for example one-hour aggregates, are again formed from all signals, for example every hour, and are stored.

Although this would, in theory, shorten the query time for an annual mean value in a report, this procedure also has to be planned and configured.

However, on account of the general approach of relational databases, the optimization described above can reach its limits very quickly and, solely on account of the large number of stored signals, results in the relational database very quickly dealing only "with itself" since the histories have to be searched again and again in order to continuously generate the aggregates, that is to say the last day or the last hour has to be read, for example, and all values read have to be calculated.

Another disadvantage arises in this case when overwriting historical data. In the case of forecasting systems, for example, the cyclically determined new forecasts, that is to say historical times series in the future, are created and in the process the old forecasts are continuously overwritten. In this case, the previously created aggregate values would suddenly become worthless since other values are now produced and could be used again only in the next run. In addition, both relational variants would not be readily possible. The data model in the database would have to contain special extensions for future values.

Another method which uses high-performance proprietary, data-stream-oriented storage methods in a proprietary database format in a database is described below using the PGIM (Power Generation Information Manager) server used by ABB. In this case, a relational data model is not used during storage. Rather, each signal is treated like a separate database. This principle circumvents the procedure of the above-described relational approach in that a fixed pattern with regard to the data rate does not have to be predefined during writing since the signals are independent. When reading a time series of a signal, the sub-database of the signal sought is directly addressed and need not be filtered from an overall database in a complicated manner. This approach results in the operators of technical installations proceeding to record all data as far as possible and thus storing all of the data which arise in the form of uncompressed data or raw data.

As a result, the data stock involved and thus the hard disk capacity used to archive process data have increased greatly in recent years. The data stock to be stored is currently in the range of 0.5 to approximately 5 terabytes, but the trend is continuing to increase based on the data stock to be stored.

In principle, the above-described use of the relational approach by means of the relational database is several factors less efficient, with regard to the possible storage and reading rate, than the use of high-performance proprietary, data-stream-oriented storage methods in a propriety database format.

However, aggregate optimization is not achieved with the use of the high-performance propriety, data-stream-oriented storage method in a proprietary database format since said optimization is several factors faster and can thus provide a sufficiently fast response in the case of long queries and usually does not allow any separate recalculations since it is designed only for raw data storage.

In addition, the following problem can arise in the two above-described methods according to the relational approach and according to the propriety approach. The historian server continuously queries aggregate values over very long periods of time, for example in order to create a report. For this purpose, the entire raw data stock of the required signals is read and the corresponding aggregates are determined. If it is assumed, for example, that a signal provides a new value approximately every second (with a resolution of one second) and stores the time stamp, the value and the status in 18 bytes, a storage space of 356*24*3600*18=528 Mbytes is involved for one year. In order to thus obtain a single annual mean value, a data stock of 528 Mbytes are read and processed in the example described above.

SUMMARY

A method is disclosed for optimized storage and processing of process values of a technical process or a technical installation in a historian server which can be integrated in a process control system of a technical installation or a technical process, comprising assigning each process value a separate signal cache for its raw values provided from the technical process; storing the raw values provided from the process in respective signal caches; assigning each raw value internal signal-specific aggregate accumulators for desired aggregates; and incrementally changing the aggregate accumulators for a defined interval when a new raw value arrives.

A system is disclosed for the optimized storage and processing of process values of a technical process or a technical installation in a historian server which can be integrated in a process control system of a technical installation or a technical process, comprising: a separate individual signal cache assigned to each process value for storing raw values provided from the process; and a processor for assigning each raw value internal signal-specific aggregate accumulators for desired aggregates, and for incrementally changing the aggregate accumulators for a defined interval when a new raw value arrives.

A process control system is disclosed containing a processor for performing a computer implemented method for storage and processing of process values of a technical process or a technical installation in a historian server, the method comprising: associating a dedicated signal cache with each process value for storing raw values provided by the process for the process value; storing the raw values provided by the process in a respective signal cache for each process value; and associating internal signal-individual aggregate accumulators for the desired aggregates with each raw value, wherein the aggregate accumulators are incrementally modified for a defined interval when a new raw value is received.

BRIEF DESCRIPTION OF THE DRAWING

The disclosure and advantageous refinements and improvements of the disclosure are intended to be described and explained in more detail using the exemplary embodiment illustrated in FIG. 1.

FIG. 1 shows an exemplary embodiment of a system for optimized storage and processing of process values of a technical process or a technical installation in a historian server.

DETAILED DESCRIPTION

A method is disclosed for the optimized storage and processing of process values (also referred to as process measured values or process data) of a technical process or a technical installation in a historian server and a corresponding system for carrying out the method. For example, the speed when reading aggregate values can be increased with the disclosed method for the optimized storage and processing of process values in a historian server.

The disclosure relates to a storage and access method which is based on the fact that an aggregate memory which automatically maintains itself creates and maintains the aggregate determinations online for each signal without additionally reading the historical data stocks again. At the same time, the aggregate values created are automatically used for client queries without the client application having to specifically address the aggregate values.

The text below describes when, where and how the aggregates are formed. For this purpose, each signal is allocated a separate RAM cache (also referred to as an individual signal cache) for its corresponding raw values provided from the process. While the data are arriving, they are stored in the individual signal caches.

Furthermore, each signal additionally has internal signal-specific aggregate accumulators for the desired aggregates, for example a respective minimum value, maximum value and integral value. When a new value having a time stamp, a value and a status arrives, the aggregate accumulators are already accordingly changed incrementally for the defined interval. For this purpose, a new value which is smaller than the current individual minimum aggregate accumulator value (also referred to as minimum accumulator value below) is accepted as a new minimum accumulator value.

The procedure can be the same for a maximum aggregate accumulator value (also referred to as maximum accumulator value) and for an aggregate accumulator integral (also referred to as integral accumulator), the added area being added for an integral accumulator. If the time stamp of a new value now exceeds a predefined interval limit, for example one hour, all aggregates can now be immediately formed from the accumulators without a further operation of reading historical data and can be stored in the signal-specific aggregate memory (4), e.g., on a hard disk. The accumulators are simultaneously (i.e., at or sufficiently near the same time as to be effectively considered the same time) initialized for the next interval.

The signal-specific aggregate memory can be on a hard disk and configured with an individual life time, and can organize the aggregate data in the form of a so-called ring memory. For this purpose, the configured aggregate history can be automatically concomitantly maintained for the corresponding signal.

Configuring the memory in the form of a ring advantageously means that no data on the hard disk have to be shifted since only the pointers to the start and the end are changed and direct overwriting thus takes place at a defined position.

If historical data have to be overwritten, for example forecast values or corrections in determined histories, the aggregates are likewise immediately (i.e., as soon as practicable for a given application) concomitantly determined again for the time range to be overwritten and the correction is immediately stored in the aggregate memory. Since the raw data required for the determination can be present in the memory anyway, this operation likewise can take place in a very fast manner.

The aggregate memories can be in the form of a cascade. This makes it possible, for example, to convert five-minute aggregates into one-hour aggregates. For this purpose, the aggregates are determined in the next higher aggregate memory, for example an hour aggregate, again according to the above-described principle for the raw data, each aggregate cache again having a RAM cache and an aggregate accumulator, this time for the higher level.

In one exemplary embodiment of the disclosure, a concurrent process in the historian server monitors the required aggregates cyclically, for example daily, to the effect that very slow signals, such as signals which change on average slower than every 20 seconds, are not stored in the aggregate memory since their storage in the aggregate memory is not expedient on account of the small volume of data which arises. In this case, a decision can be automatically made regarding which signals are stored in the aggregate memory and which signals no longer require aggregate memories.

The exemplary method according to the disclosure thus can enable an enormous increase in performance when reading aggregate values without changing the overall behavior of the historian server elsewhere. That is to say, in comparison with the known methods, the queries do not selectively load the server to such an extent that a real-time response is possible.

Further, the aggregate values can be immediately available after the predefined time interval has been exceeded. There is no need to wait for a further database run, as for example in the relational approaches with OLAP, typically at night. All aggregate data are therefore consistent.

Since histories no longer have to be read in order to determine the aggregates, there is an enormous increase in performance in comparison with previous solutions both with regard to the possible storage rate of raw values and the reading rate of aggregate values.

Furthermore, a drop in the performance of the database as a result of an additional aggregate determination run can be advantageously avoided since this run is completely dispensed with here. The whole computer power is thus always available for the client queries.

Since each signal has an individual aggregate cache, the real-time behavior needed for historian servers can be guaranteed, without any problems, during reconfiguration work to be carried out on the database. In contrast to the known standard SQL databases, non-deterministic, hidden and database-internal restructuring is not carried out, as a result of which the time of every action can be forecast.

The aggregate values are seamlessly integrated in a query module (also referred to as a query engine) and thus simplify the queries from client applications. From the point of view of a client, only the raw signal exists. From the point of view of the client, all aggregates can be queried dynamically and depending on the situation.

If, for example, an aggregate memory contains 5-minute aggregates and a client queries aggregates after 15 minutes, the 15-minute aggregates are automatically formed from the 5-minute aggregates, not from the individual values which were recorded in the 15 minutes, as previously customary. From the point of view of the client, there is thus only the raw signal and all aggregates can be queried dynamically and depending on the situation.

As a result of the fact that each signal has its own timing by virtue of the currently available value, it can be advantageously possible to additionally also hold forecast values, which contain a future value as the most current value, in addition to the normal histories which arrive in real time, that is to say signals which generally have the current time as the most current measured value, without the need for complicated configuration, which is customary in SQL or OLAP methods, or even a more specific database design.

An exemplary system for carrying out the method according to the disclosure can be encompassed by a system for the optimized storage and processing of process values of a technical process or a technical installation in a historian server which can be integrated in a process control system of a technical installation or a technical process, wherein each process value can be assigned a separate individual signal cache for its raw values provided from the process. The raw values provided can be stored in the individual signal caches. Each raw value can be additionally assigned internal signal-specific aggregate accumulators for the desired aggregates, and the aggregate accumulators can be accordingly changed incrementally for the defined interval when a new raw value arrives.

An exemplary disclosed system for the optimized storage and processing of process values of a technical process or a technical installation in a historian server, which can be integrated in a process control system of a technical installation or a technical process, can comprise a respective separate individual signal cache for the raw data of a process value, which signal cache is allocated the corresponding raw values provided from the process. While the data are arriving, they are stored in the individual signal caches.

When the corresponding raw values arrive in the historian server, they can be stored in the individual signal caches. Furthermore, each raw value can be additionally assigned internal signal-specific aggregate accumulators for the desired aggregates. When a new value arrives, the aggregate accumulators can be accordingly changed incrementally for the defined interval.

The raw values can each be assigned a time stamp, a value and a status. When a predefined interval limit of the time stamp of the new value is exceeded, all aggregates can be immediately formed from the accumulators without a further operation of reading historical data, can be stored in the signal-specific aggregate memory, e.g., on a hard disk, and the accumulators can simultaneously be initialized for the next interval.

In one exemplary embodiment of the disclosure, the signal-specific aggregate memory on a hard disk can be configured with an individual life time and the aggregate data can thus be organized in the form of a ring memory.

FIG. 1 shows an exemplary embodiment of the disclosed system for the storage and processing of process values of a technical process or a technical installation in a historian server 1, which system can include a processor, and can be integrated in a process control system and shows the data flow and the sequence of aggregate formation. Such storage and processing can be optimized in a manner as disclosed herein.

Such a system according to the disclosure comprises a separate individual signal cache 2 for each signal, said signal cache being allocated the corresponding raw values provided from the process. For this purpose, the raw values (also referred to as values or data below) which arrive via a scan manager 3 are stored in the individual signal caches 2. In this case, the raw values can each be assigned a time stamp, a value and a status.

The server 1 can include a processor represented in FIG. 1 as one or more software or hardware modules. For example, a scan manager 3 is provided for the purpose of collecting the data provided by the process control system in the form of data packets and supplying them to the signal caches 2 in the historian server 1 in real time.

Each signal additionally has internal signal-specific aggregate accumulators 11 for the desired aggregates. When a new value arrives in the signal cache 2, the aggregate accumulator 11 is accordingly changed.

When an aggregate interval is exceeded in terms of time, the aggregate accumulator 11 transmits the accumulated values to a write storage manager 5 which then stores them in an aggregate memory 4.

A historical data query with respect to the raw values and/or the aggregates from a client application is effected using a so-called user API (Application Programming Interface) 7.3 which forwards the query to a read storage manager 6. The latter decides whether the data are determined directly from the signal caches 2 or from the raw data files 10 or, simply, from the aggregate files in the aggregate memory 4.

The history of a signal is likewise overwritten by a client application, for example with forecasting series, via the user API 7.3 which forwards the query to the write storage manager 5. The latter carries out direct overwriting in the raw data files 10, immediately determines the new aggregate values 11 affected without a further reading action in the RAM and likewise overwrites these values in the aggregate memory 4. Raw data and the pertinent aggregates are thus advantageously always synchronous.

An exemplary system according to the disclosure also has a flush manager 8 which controls "hard-disk-friendly" emptying of the respective caches using a so-called cache flush process.

To this end, the cache flush process causes the cache contents to be completely written to the write manager 5 which, in turn, writes the contents of the signal cache to a raw data file 10 and writes the aggregate values 11 to the aggregate memory 4. The signal cache 1 which is now empty is then available again for recording the next values.

The cache flush process also controls an individual dynamic cache size on the basis of the signal speed. For example, the so-called fast signals are assigned many values per unit of time. These signals are allocated larger short-term caches. In contrast, slow signals gradually give up their cache memory to fast signals.

The cache flush process which is thus time-controlled and capacity-controlled operates in such a manner that as few data access operations as possible are required or the data access operation is distributed as evenly as possible.

The signal-specific aggregate memory 4 can be organized as a so-called ring memory, as a result of which the configured aggregate history for the corresponding signal is always automatically concomitantly maintained in an advantageous manner.

The flush manager process 8 can automatically concurrently determine and decide, for example once a night, whether a signal is actually intended to receive an aggregate cache.

A security manager 9 which is intended to manage different use rights, such as read, write and/or configuration rights, for different users of the historian server is also integrated in the historian server 1.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for optimized storage and processing of process values of a technical process or a technical installation in a historian server which is integrated in a process control system of a technical installation or a technical process, comprising:
   assigning each process value a separate signal cache for its raw values provided from the technical process;
   storing in real time, the raw values provided from the process in respective signal caches;
   assigning each raw value internal signal-specific aggregate accumulators for desired aggregates;
   incrementally changing the aggregate accumulators for a defined interval when a new raw value arrives; and
   forming all aggregates from the aggregate accumulators without a further operation of reading historical data when a predefined time interval is exceeded and storing all formed aggregates in an aggregate memory.

2. The method as claimed in claim 1, wherein each of the raw values are assigned a time stamp, a value and a status.

3. The method as claimed in claim 2, wherein all aggregates are formed when a predefined interval limit of the time stamp of the new raw value is exceeded, and stored in a signal-specific aggregate memory, and the aggregate accumulators are simultaneously initialized for a next interval.

4. The method as claimed in claim 3, wherein the signal-specific aggregate memory is on a hard disk configured with an individual life time, and aggregate data are organized as a ring memory.

5. A system for the optimized storage and processing of process values of a technical process or a technical installation in a historian server which is integrated in a process control system of a technical installation or a technical process, comprising:
   a separate individual signal cache assigned to each process value for storing in real-time, raw values provided from the process; and
   a processor for assigning each raw value internal signal-specific aggregate accumulators for desired aggregates, incrementally changing the aggregate accumulators for a defined interval when a new raw value arrives, and forming all aggregates from the aggregate accumulators without a further operation of reading historical data when a predefined time interval is exceeded and storing all formed aggregates in an aggregate memory.

6. The system as claimed in claim 5, wherein the raw values can be assigned a time stamp, a value and a status.

7. The system as claimed in claim 6, wherein when all aggregates are formed a predefined interval limit of the time stamp of the new raw value is exceeded, and stored in a signal-specific aggregate memory, and the aggregate accumulators are simultaneously initialized for a next interval.

8. The system as claimed in claim 7, wherein the signal-specific aggregate memory is on a hard disk configured with an individual life time, and aggregate data are organized as a ring memory.

9. A process control system containing a processor for performing a computer implemented method for storage and processing of process values of a technical process or a technical installation in a historian server, the method comprising:
  associating a dedicated signal cache with each process value for storing raw values provided by the process for the process value;
  storing in real-time, the raw values provided by the process in a respective signal cache for each process value;
  associating internal signal-individual aggregate accumulators for the desired aggregates with each raw value, wherein the aggregate accumulators are incrementally modified for a defined interval when a new raw value is received; and
  forming all aggregates from the aggregate accumulators without a further operation of reading historical data when a predefined time interval is exceeded and storing all formed aggregates in an aggregate memory.

* * * * *